Figure 1:
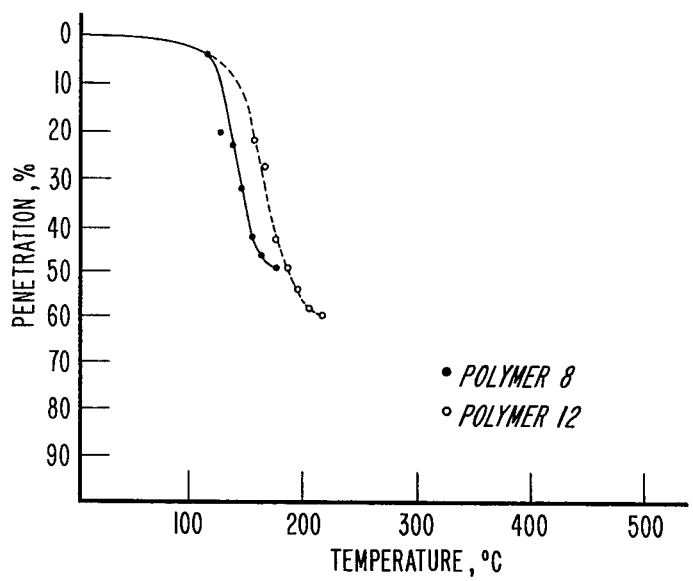

United States Patent [19]

Marvel et al.

[11] 4,252,937

[45] Feb. 24, 1981

[54] POLYAROMATIC ETHER-KETO-SULFONES AND THEIR SYNTHESIS

[75] Inventors: Carl S. Marvel, Tucson, Ariz.; Richard L. Frentzel, St. Petersburg, Fla.

[73] Assignee: The United States of America as represented by the Secretary of the Air Force, Washington, D.C.

[21] Appl. No.: 47,528

[22] Filed: Jun. 8, 1979

[51] Int. Cl.$^3$ .................... C08G 65/40; C08G 75/23
[52] U.S. Cl. .................... 528/126; 528/125; 528/128; 528/173
[58] Field of Search ............... 528/125, 126, 128, 173

[56] References Cited

U.S. PATENT DOCUMENTS

| | | | |
|---|---|---|---|
| 3,935,167 | 1/1976 | Marvel et al. | 528/125 |
| 3,956,240 | 5/1976 | Dahl et al. | 528/125 |
| 4,065,437 | 12/1977 | Blinne et al. | 528/125 |

*Primary Examiner*—Lester L. Lee
*Attorney, Agent, or Firm*—Donald J. Singer; Cedric H. Kuhn

[57] ABSTRACT

Polymers having pendant phenylethynyl groups are obtained by reacting phenylacetylene with a bromine-containing polymer prepared by reacting bis-p-phenoxy-4,4'-(2,2'-dibromodiphenyl)ketone or 2,2'-dibromodiphenyl-4,4'-dicarbonyldichloride with isophthaloyl dichloride and 4,4'-bis-p-phenoxydiphenylsulfone. Because the polymers cure without the evolution of volatiles and have softening points higher than their cure temperatures, they are especially suitable for use in fabricating fiber-reinforced composites.

13 Claims, 3 Drawing Figures

POLYAROMATIC ETHER-KETO-SULFONES AND THEIR SYNTHESIS

RIGHTS OF THE GOVERNMENT

The invention described herein may be manufactured and used by or for the Government of the United States for all governmental purposes without the payment of any royalty.

FIELD OF THE INVENTION

This invention relates to polyaromatic ether-keto-sulfones. In one aspect it relates to a process for synthesizing the polymers.

BACKGROUND OF THE INVENTION

In recent years polymeric materials have become available that possess heat resistance and strength properties previously found only in metals. Additionally, the polymers are much lighter than metals, an important advantage where weight is a factor as in modern, high speed aerospace applications. While it is possible to tailor a polymer system for a given application, the processing problem has been a restrictive factor in limiting the use of high temperature resistant polymers.

In processing a polymer into a composite structure, the polymer must flow in order to impregnate the reinforcing substrate and mold it to the desired form. The lower the softening point (Tg) or the melting point (Tm) of a polymer the easier it is to cause the polymer to flow. While it is desirable that a polymer have a low softening point, a composite fabricated from such a polymer loses its strength at temperatures approaching its softening point. In order that such a composite may be suitable for use at temperatures higher than the polymer's softening point, a procedure is required for subsequently raising the softening point of the polymer higher than the desired maximum use temperature.

The conventional method of raising polymer softening points is to cure the polymer by joining new chemical bonds or crosslinks between polymer chains. In the curing method often utilized, a trifunctional monomer is used in the polymer synthesis to provide crosslinking sites along the polymer backbone. This method often leads to branching and gelation during synthesis or storage of prepreg solutions. Other methods for accomplishing crosslinking include radiation, addition of a free radical source, incorporation of a pendant group which can react thermally or chemically, and thermal scission of C-H bonds in the polymer backbone.

There are three principal disadvantages to the crosslinking method of cure. One disadvantage results from the evolution of volatiles from any type of cure in which a condensation reaction is used. Because volatiles are evolved, voids are formed by entrapped gases, effectively weakening the composite structure. A second disadvantage derives from the brittleness which is inherent in a three-dimensional network. The third disadvantage lies in the fact that the softening point is raised only as high as the cure temperature because of "freezing in" of the reactive sites when the polymer softening point reaches the cure temperature. In other words, the polymer begins to soften as the use temperature approaches the cure temperature.

In U.S. Pat. No. 3,876,814, F. L. Hedberg and F. E. Arnold disclose quinoxaline polymers having pendant phenylethynyl groups. Because of the presence of these groups, the polymers can be cured to polymers which can be used at temperatures above this cure temperatures. Furthermore, in the heating operations during which the polymers are cured, there is no evolution of volatile by-products.

It is a principal object of this invention to provide polymeric materials which are precursors for synthesizing polyaromatic keto-ether-sulfones having pendant phenylethynyl groups.

Another object of the invention is to provide a process for preparing the precursors.

A further object of the invention is to provide polymers having pendant phenylethynyl groups which cure without the evolution of volatiles and which in the cured state exhibit softening points above their cure temperatures.

Still another object of the invention is to provide a process for preparing polyaromatic ether-keto-sulfones having pendant phenylethynyl groups.

Figure 2:
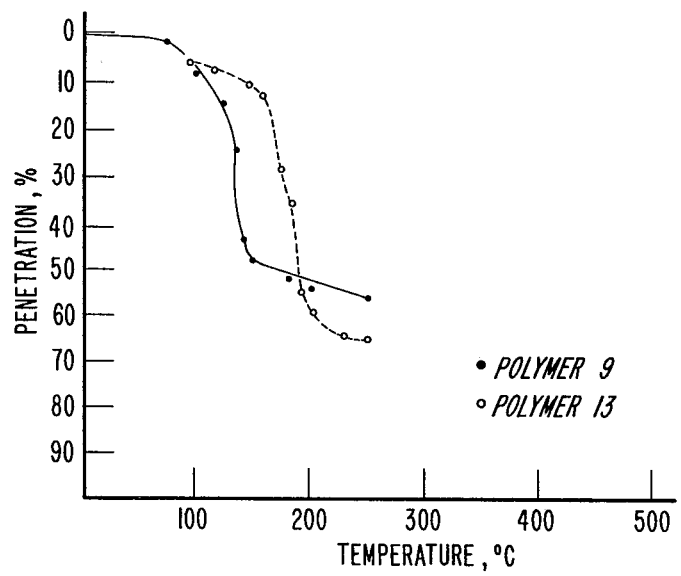
Figure 3:
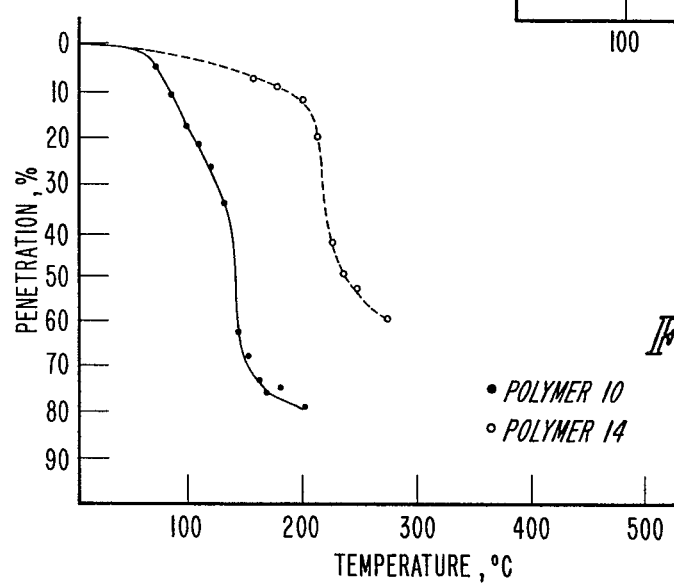

Other objects and advantages of the invention will become apparent to those skilled in the art upon consideration of the accompanying disclosure and the drawing in which FIGS. 1, 2 and 3 show Vicat softening curves for uncured and cured polymers of the invention.

SUMMARY OF THE INVENTION

The present invention resides in polyaromatic ether-keto-sulfones consisting essentially of recurring units having the following structural formula:

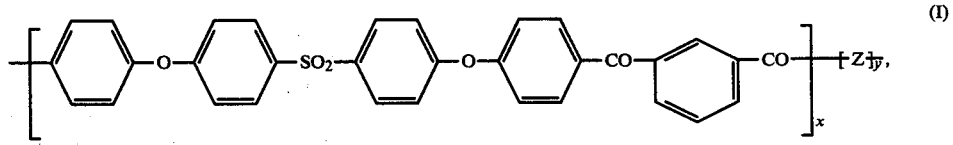

wherein Z is

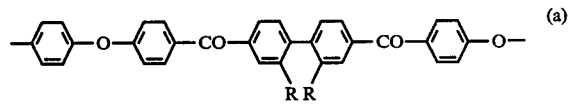

or

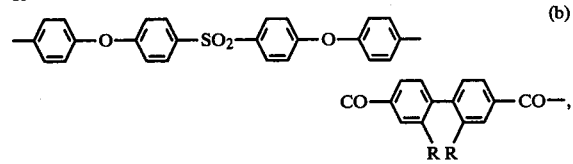

in which R is bromine or phenylethynyl, the ratio of x to y ranges from about 1 to 10:1, and the sum of x and y has a value such that the polymer has a molecular weight ranging from about 1300 to 10,000. The sum of x and y can also be defined as having a value such that the polymer has an inherent viscosity of 0.1 to 1.0 as determined in sulfuric acid at 30° C.

In one embodiment, the invention lies in the process for preparing the above described polymer in which R is bromine. The reaction involved in the synthesis can be represented by the following equation:

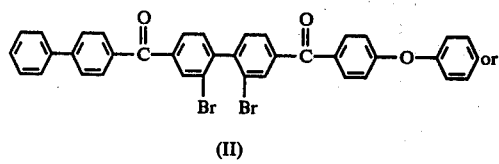
(II)

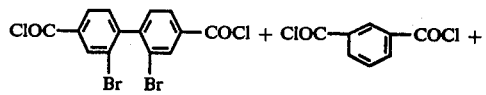
(III)    (IV)

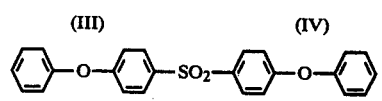
(V)

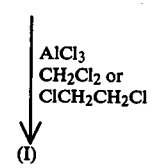
(I)

As shown by the above equation, bis-p-phenoxyphenyl-4,4'-(2,2'-dibromodiphenyl)ketone (II) or 2,2-dibromodiphenyl-4,4'-dicarbonyldichloride (III) is reacted with isophthaloyl dichloride (IV) and 4,4'-bis-p-phenoxydiphenylsulfone (V). When z in the formula defining polymer I is group (a), dibromoketone II is used as one of the reactants. Diacid dichloride III is employed when Z in the formula defining polymer I is group (b). The polymerization reaction is conducted under an inert gas in the presence of a catalytic amount of aluminum chloride, employing a solvent as the reaction medium. It is usually preferred to use an excess of the aluminum chloride, e.g., 5 to 40 moles of aluminum chloride per mole of compounds II or III. Examples of inert gases that can be used include nitrogen, argon and helium. As a solvent it is usually preferred to utilize dichloromethane or dichloroethane. While the reaction is conveniently carried out at room temperature, higher temperatures ranging from room temperature to 50° C. can be used. The reaction period usually ranges from about 12 to 72 hours although shorter and longer times can be used.

The amounts of the reactants used in the process can be varied within rather broad limits so as to obtain a polymer product having a desired molecular weight (inherent viscosity). When preparing a polymer according to formula I in which Z is group (a) and X is bromine, for each mole of dibromoketone II at least 2 moles of isophthaloyl dichloride IV and at least 1 mole of phenoxydiphenylsulfone V are used. In the preparation of a polymer of formula I in which Z is group (b) and X is bromine, for each mole of diacid dichloride III at least 1 mole of isophthaloyl dichloride IV and at least 2 moles of phenoxydiphenylsulfone V is used.

The isophthaloyl dichloride IV is a well known compound that is described in the literature. The preparation of diacid dichloride III and dibromoketone II is illustrated by the following equations:

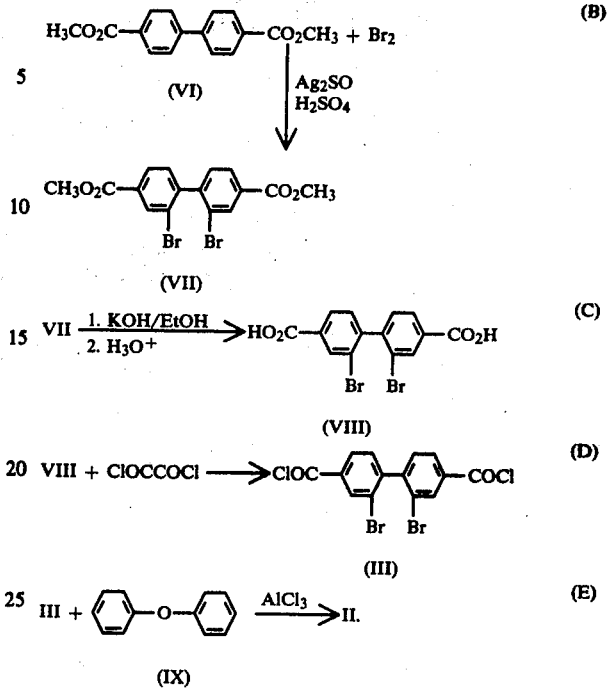

As indicated by equation B, dimethyldiphenyl dicarboxylate VI is reacted with bromine in sulfuric acid in the presence of silver sulfate. The product obtained, namely, dimethyl-2,2'-dibromodiphenyl dicarboxylate VII is hydrolyzed to the diacid VIII as shown in equation C. According to equation D, the diacid is converted to the diacid dichloride III by using oxalyl chloride. The diacid dichloride is transformed to bis-p-phenoxyphenyl-4,4'-(2,2'-dibromodiphenyl)ketone II by using biphenyl ether IX and aluminum chloride in a Friedel-Crafts type condensation as illustrated by equation E.

In another embodiment, the invention lies in the process for preparing a polymer product according to formula I in which R is phenylethynyl. According to this process, the polymers of formula I in which R is bromine are treated with phenylacetylene in the presence of a catalytic amount of palladium acetate and triphenylphosphine, employing a mixture of pyridine and triethylamine as the reaction medium. The amount of phenylacetylene used is that which is sufficient to replace the bromine atoms in the polymer chain. In general, at least 2 moles of phenylacetylene per mole of polymer are utilized. The reaction is conducted in an inert atmosphere at a temperature ranging from about 100° to 120° C. for a period of about 3 to 6 hours.

Curing of the polymers containing phenylethynyl groups is accomplished by heating them in an inert atmosphere at a temperature ranging from about 250° to 325° C. A heating period of up to 24 hours can be employed although a complete cure can be obtained in shorter periods of time. In the curing operation, intramolecular cyclization of the pendant phenylethynyl groups occurs, resulting in a cured polymer having benzanthracene linkages.

A more complete understanding of the invention can be obtained by referring to the following illustrative examples which are not intended, however, to be unduly limitative of the invention.

EXAMPLE I

Preparation of 2,2'-Dibromodiphenyl-4,4'-dicarbonyl dichloride (III)

(a) Dimethyl-2,2'-dibromodiphenyl-4,4'-dicarboxylate (VII)

Dimethyldiphenyl dicarboxylate (VI) (90 mmole) was dissolved in concentrated sulfuric acid (260 ml) in a flask equipped with an overhead stirrer. Silver sulfate (81.3 g) and, after cooling to 0° C., dimethylformamide (20 ml) and bromine (4.32 ml) were added. After 5 minutes additional bromine (4.32 ml) was added. After 10 minutes the mixture was allowed to warm to room temperature. Following 30 more minutes, the mixture was poured onto ice. The green solid was collected by filtration and continuously extracted (Soxhlet) into methanol (500 ml) overnight. The product (56% yield), which had a melting point of 114° C., was crystallized from methanol.

(b) 2,2'-Dibromo-4,4'-diphenic acid (VIII)

Dimethyl-2,2'-dibromodiphenyl-4,4'-dicarboxylate (VII) (32 mmole) was dissolved in hot ethanol (200 ml). Potassium hydroxide (10 g) was added and the solution was allowed to boil until a solid formed. After cooling the solid was collected by filtration and dissolved in water. HCl was added until the solution was acidic. The solid which formed was collected by filtration and dried in vacuo at 100° C. for 24 hours. The product (80% yield), which had a melting point of 293°-294° C., was recrystallized from ethanol-water.

(c) 2,2'-Dibromodiphenyl-4,4'-dicarbonyl dichloride (III)

2,2'-Dibromo-4,4'-diphenic acid (VIII) (22 mmole) was added to dry benzene (105 ml) and pyridine (10.5 ml) in a flask equipped with an overhead stirrer. Oxalyl chloride (49 ml) was slowly added. The mixture was stirred for 1 hour under nitrogen at room temperature. The temperature was then raised to 76°-78° C. for 6 hours. After cooling to room temperature, the solution was filtered and all volatiles were removed from the filtrate on a rotary evaporator. Boiling hexane (about 300 ml) was added to the oily residue. The hexane solution was filtered from a small amount of solid residue. The product (76% yield), which had a melting point of 81°-82° C., was crystallized from hexane.

Analysis Calc'd for $C_{14}H_6O_2Cl_2Br_2$: C, 38.49; H, 1.31; Cl, 16.20; Br, 36.58. Found: C, 38.78; H, 1.49; Cl, 15.96; Br, 36.36.

EXAMPLE II

Preparation of bis-p-phenoxyphenyl-4,4'-(2,2'-dibromodiphenyl) ketone (II)

2,2'-Dibromodiphenyl-4,4'-dicarbonyldichloride (III) (10.9 mmole) and diphenyl ether (0.647 mole) were dissolved in methylene chloride (276 ml). Aluminum chloride (30.7 g) was added and the mixture was stirred for several days under nitrogen. The mixture was washed three times with water. The methylene chloride solution was dried over sodium sulfate, filtered, and solvent removed on a rotary evaporator. Excess diphenyl ether was vacuum distilled from the residue. The oily residue was dissolved in and crystallized from a large volume of boiling hexane. The product (81% yield) had a mp of 127°-130° C.

Analysis Calc'd for $C_{38}H_{24}O_4Br_2$: C, 64.79; H, 3.43; Br, 22.69. Found: C, 64.72; H, 3.86; Br, 22.75.

EXAMPLE III

Runs were carried out in which polymer 1 and 2 were prepared by dissolving bis-p-phenoxyphenyl-4,4'-(2,2'-dibromodiphenyl)ketone (II), isophthaloyl dichloride (IV) and 4,4'-diphenoxyphenylsulfone (V) in 70 ml dry methylene chloride (polymer 1) or in 70 ml of dry dichloroethane (polymer 2). Aluminum chloride (2.66 g; 20 mmole) was added and the mixtures were stirred for 2 days at room temperature after flushing with argon. The precipitated polymers were collected by filtration, washed 3 times with methanol (about 300 ml) in a blender and dried in vacuo. The quantities of monomers used, properties of the polymers, and analytical data are set forth below in Table I.

EXAMPLE IV

Runs were conducted in which polymers 3, 4, 5 and 6 were prepared by dissolving 2,2'-dibromodiphenyl-4,4'-dicarbonyldichloride (III), isophthaloyl dichloride (IV) and 4,4'-diphenoxydiphenylsulfone (V) in dichloromethane. Aluminum chloride (2.66 g; 20 mmole) was added and, after flushing with argon, the mixtures were stirred for 2 days at room temperature. The precipitated polymers were collected by filtration, washed 3 times with a large volume of methanol in a blender and dried in vacuo. The quantities of monomers used, properties of the polymers, and analytical data are set forth below in Table I.

TABLE I

| Poly-[1] mer No. | V,[2] mmole | IV,[3] mmole | ratio[4] x to y | Yield % | MP, °C. | Inh. Vis. (Solvent) | Analysis Calc'd / Found[5] C | H | S | Res% |
|---|---|---|---|---|---|---|---|---|---|---|
| 1 | 4 | 10 | 4:1 | 67 | 180 | 0.1 (CHCl₃) | 69.38 / 69.64 | 3.37 / 3.61 | 3.90 / — | |
| 2 | 4 | 10 | 4:1 | 77 | 180 | 0.1 (CHCl₃) | 69.38 / 68.75 | 3.37 / 3.78 | 3.90 / — | |
| 3 | 10 | 9.5 | 9:1 | 50 | >350 | 0.28 (CHCl₃) | 70.20 / 68.62 | 4.00 / 3.65 | 5.68 / 5.40 | |
| 4 | 6.5 | 6.3 | 5.5:1 | 73 | >350 | 0.21 (DMF) | 69.38 / 67.94 | 3.92 / 3.48 | 5.48 / 5.44 | |
| 5 | 10 | 9.5 | 9:1 | 71 | >350 | 0.75 (H₂SO₄) | 70.20 / 68.85 | 4.00 / 3.74 | 5.68 / 5.52 | |

TABLE I-continued

| Poly-[1] mer No. | V,[2] mmole | IV,[3] mmole | ratio[4] x to y | Yield % | MP, °C. | Inh. Vis. (Solvent) | Analysis Calc'd/Found[5] | | | Res% |
|---|---|---|---|---|---|---|---|---|---|---|
| | | | | | | | C | H | S | |
| 6 | 5 | 4 | 4:1 | >100 | >350 | 0.52 (H₂SO₄) | 58.23 / 51.34 | 5.16 / 3.77 | 7.33 / 3.3[6] | 9.07 |

[1] Based upon 1 mmole of bis-p-phenoxyphenyl-4,4'-(2,2'-dibromodiphenyl)ketone for polymer 1 and 2 and 1 mmole of 4,4'-diphenoxydiphenylsulfone for polymers 3–6.
[2] 4,4'-Bis-p-phenoxydiphenylsulfone.
[3] Isophthaloyl dichloride.
[4] Ratio of x to y in Formula I.
[5] Corrected for residue.
[6] Uncorrected for residue.

EXAMPLE V

Runs were carried out in which the bromine atoms of polymers 1 and 2 (Example III) were replaced with phenylethynyl groups. Thus, polymers 7 and 8 were prepared by the reaction of polymers 1 and 2 with phenylacetylene in the presence of palladium acetate and triphenylphosphine. In each of two runs, polymer 1 or 2 (1.3 g), palladium acetate (46 mg) and triphenylphosphine (104 mg) were dissolved in pyridine (20 ml). Phenylacetylene (2 ml) and triethylamine were introduced after flushing the flask with argon. A precipitate formed immediately, but it appeared to redissolve as the temperature was increased to 100° C. The mixture was mechanically stirred at 110° C. for 4 hours and then cooled overnight. The solvent, pyridine and triethylamine, were removed on a rotary evaporator. The residue was dissolved in chloroform (about 110 ml) and the solution was extracted with about 100 ml each of water, 2 N HCl, water and saturated NaCl. After drying over MgSO₄ and filtering, the volume of the chloroform was reduced to about 20 ml. The solution was placed on a column of alumina and a large volume of benzene was passed through to separate the desired product from the benzene soluble impurities. A large volume of chloroform was then passed through to separate the product from the palladium catalyst which remained on the column. The chloroform was evaporated in vacuo after which the product was washed with benzene and dried in vacuo. Properties of polymers 7 and 8 are set forth below in Table II. The solubilities of the polymers remained unchanged from their bromine-containing precursors.

EXAMPLE VI

Runs were carried out in which polymers 9 and 10 containing phenylethynyl groups were prepared in 90 percent yield by reacting polymers 3 and 5 (Example IV) with phenylacetylene in the presence of phenylacetate and triphenylphosphine in a triethylamine-pyridine solvent mixture. In each run the bromine-containing polymer (1.3 g), palladium acetate (46 mg) and triphenylphosphine (104 mg) were dissolved in pyridine (20 ml). Phenylacetylene (2 ml) was then added followed by triethylaluminum. A solid which formed immediately appeared to redissolve when the temperature was increased to 100° C. The mixture was stirred and heated at 110° C. for 4 hours under argon. After cooling for several hours, the precipitated polymer was collected by filtration, washed in a blender three times with benzene and dried in vacuo. The polymers were soluble in sulfuric acid and partially soluble in dimethylformamide (DMF) and dimethylacetamide (DMA). Properties of polymers 9 and 10 are set forth below in Table II.

TABLE II

| Polymer No. | Yield, % | MP, °C. | Analysis Calc'd/Found | | |
|---|---|---|---|---|---|
| | | | C | H | S |
| 7 | 90 | 200 | 75.50 / 75.99 | 3.46 / 4.01 | 3.66 / — |
| 8 | 90 | 200 | 75.50 / 72.97 | 3.46 / 4.27 | 3.66 / — |
| 9 | 90 | 350 | 70.55 / 71.41 | 4.00 / 4.01 | 5.44 / 4.40 |
| 10 | 90 | 350 | 70.55 / 71.31 | 4.00 / 4.07 | 5.44 / 4.64 |

EXAMPLE VII

Polymers 7 and 8 (Example V) were cured by heating under argon at 270° C. for 24 hours, changing them into insoluble, fused resins 11 and 12. The Vicat softening curves of polymer 8 (uncured) and polymer 12 (cured) are shown in FIG. 1. The cured polymer failed to melt below 300° C.

Polymers 9 and 10 (Example VI) were cured at 300° C. for 24 hours under argon, producing polymers 13 and 14. The cured polymers 13 and 14 were insoluble in concentrated sulfuric acid. Vicat softening curves for the cured and uncured polymers are shown in FIGS. 2 and 3.

The following are the conditions used in obtaining the data for the Vicat softening curves shown in FIGS. 1, 2 and 3:
ΔT: 60° C./hour
Load: 44.9 psi
Atmosphere: Static air.

The curing conditions are summarized and the melting points of the cured polymers are shown below in Table III.

TABLE III

| Uncured Polymer | Cured Polymer | Curing Temp, °C. | Curing Time, hrs | MP, °C. Cured Polymers |
|---|---|---|---|---|
| 7 | 11 | 270 | 24 | 300 |
| 8 | 12 | 270 | 24 | 300 |
| 9 | 13 | 300 | 24 | 350 |
| 10 | 14 | 300 | 24 | 350 |

EXAMPLE VIII

A run was carried out in which a glass laminate was prepared. Polymer 9 (70 mg) was placed on a piece of glass fiber cloth (1.5"×1.5") and covered with another piece of cloth. An additional amount of polymer (70 mg) was placed on the second piece of cloth and a third piece was placed on top. A few drops of DMF was added after wrapping in aluminum foil. The foil was heated at 325° C. under 6000 psi for several hours. The aluminum foil was dissolved in dilute HCl leaving a glass laminate.

As seen from the foregoing, the present invention provides polymeric materials which are precursors for synthesizing polymers having phenylethynyl groups. The latter polymers have softening points that are higher than their cure temperature. Also, as shown by the Vicat softening curves in FIGS. 1, 2 and 3, the cured polymers have higher softening point temperatures than do the uncured polymers. Because of these desirable properties and since the polymers cure without the evolution of volatile by-products, the polymers are particularly suitable for use in fabricating fiber-reinforced composites.

As will be evident to those skilled in the art modifications of the present invention can be made in view of the foregoing disclosure without departing from the spirit and scope of the invention.

We claim:

1. A polyaromatic ether-keto-sulfone consisting essentially of recurring units having the following formula:

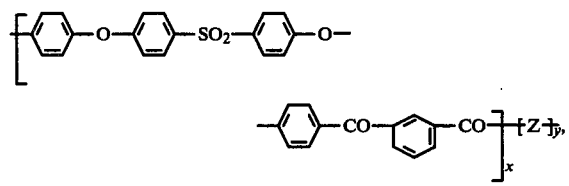

wherein Z is

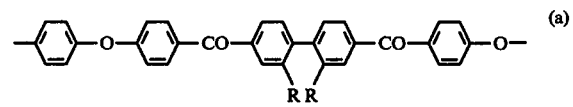

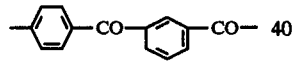

or

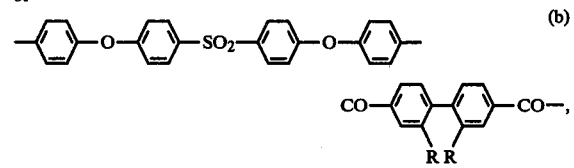

in which R is bromine or phenylethynyl, the ratio of x to y ranges from about 1 to 10:1, and the sum of x and y has a value such that the polymer has a molecular weight ranging from about 1300 to 10,000.

2. The polymer according to claim 1 in which Z is group (a) and R is bromine.

3. The polymer according to claim 1 in which Z is group (a) and R is phenylethynyl.

4. The polymer according to claim 1 in which Z is group (b) and R is bromine.

5. The polymer according to claim 1 in which Z is group (b) and R is phenylethynyl.

6. A process for preparing a polyaromatic ether-keto-sulfone which comprises the following steps:
   (a) reacting in an inert atmosphere (1) bis-p-phenoxyphenyl-4,4'-(2,2'-dibromodiphenyl)ketone with (2) a mixture of isophthaloyl dichloride and 4,4'-bis-p-phenoxydiphenylsulfone in the presence of a catalytic amount of aluminum chloride; and
   (b) recovering the polymer from the reaction mixture.

7. The process according to claim 6 in which the reaction is conducted at a temperature ranging from about room temperature to 50° C. for a period ranging from about 12 to 72 hours.

8. The process according to claim 7 in which at least 2 moles of isophthaloyl dichloride and at least one mole of 4,4'-bis-p-phenoxydiphenylsulfone are used per mole of compound (1).

9. The process according to claim 8 in which the polymer recovered in step (b) is reacted in a mixture of pyridine and triethylamine with phenylacetylene in the presence of a catalytic amount of palladium acetate and triphenylphosphine.

10. A process for preparing a polyaromatic ether-keto-sulfone which comprises the following steps:
    (a) reacting in an inert atmosphere (1) 2,2'-dibromodiphenyl-4,4'-dicarbonyldichloride with (2) a mixture of isophthaloyl dichloride and 4,4'-bis-p-phenoxydiphenylsulfone in the presence of a catalytic amount of aluminum chloride; and
    (b) recovering the polymer from the reaction mixture.

11. The process according to claim 10 in which the reaction is conducted at a temperature ranging from about room temperature to 50° C. for a period ranging from about 12 to 72 hours.

12. The process according to claim 11 in which at least one mole of isophthaloyl dichloride and at least 2 moles of 4,4'-bis-p-phenoxydiphenylsulfone are used per mole of compound (1).

13. The process according to claim 12 in which the polymer recovered in step (b) is reacted in a mixture of pyridine and triethylamine with phenylacetylene in the presence of a catalytic amount of palladium acetate and triphenylphosphine.

* * * * *